United States Patent [19]

Tatsukami et al.

[11] Patent Number: 4,812,011
[45] Date of Patent: Mar. 14, 1989

[54] OPTICAL FIBER COMPRISING A METHACRYLATE POLYMER CORE AND A FLUORO POLYMER CLADDING

[75] Inventors: Yoshiharu Tatsukami, Toyonaka; Toshiki Doi, Ibaraki; Masahiko Oka, Ohtsu, all of Japan

[73] Assignees: Sumitomo Chemical Co.; Daikin Industries Ltd., both of Osaka, Japan

[21] Appl. No.: 28,008

[22] Filed: Mar. 18, 1987

Related U.S. Application Data

[63] Continuation of Ser. No. 709,106, Mar. 6, 1985, abandoned.

[30] Foreign Application Priority Data

Mar. 6, 1984 [JP]  Japan ................................ 59-43649

[51] Int. Cl.$^4$ ................................................ G02B 6/16
[52] U.S. Cl. .................................. 350/96.34; 428/373; 428/394
[58] Field of Search ................ 350/96.29, 96.30, 96.31, 350/96.34; 428/373, 375, 394, 395

[56] References Cited

U.S. PATENT DOCUMENTS

| 3,930,103 | 12/1975 | Chimura et al. | 427/163 X |
| 3,993,834 | 11/1976 | Chimura et al. | 428/373 |
| 4,264,129 | 4/1981 | Warkentine | 350/96.34 X |
| 4,505,543 | 3/1985 | Ueba et al. | 350/96.34 |
| 4,585,306 | 4/1986 | Ohmori et al. | 350/96.34 |
| 4,593,974 | 6/1986 | Yamamoto et al. | 350/96.34 |

FOREIGN PATENT DOCUMENTS

| 0097325 | 1/1984 | European Pat. Off. |
| 2741153 | 3/1978 | Fed. Rep. of Germany |
| 58-65402A | 4/1983 | Japan |
| 1565724 | 4/1980 | United Kingdom |

*Primary Examiner*—John D. Lee
*Attorney, Agent, or Firm*—Birch, Stewart, Kolasch & Birch

[57] ABSTRACT

An optical fiber comprising a core and a cladding, wherein the core is made of a polymer comprising units of methyl methacrylate, and the cladding is made of a copolymer comprising units of vinylidene fluoride and 0.5 to 10% by mole of units of hexafluoropropene, having good heat resistance and flexibility and is excellent in adhesivity between the core and the cladding.

12 Claims, No Drawings

OPTICAL FIBER COMPRISING A METHACRYLATE POLYMER CORE AND A FLUORO POLYMER CLADDING

This is a continuation application of our application Ser. No. 709,106, filed Mar. 6, 1985 (abandoned).

FIELD OF THE INVENTION

The present invention relates to an optical fiber. More particularly, it relates to an optical fiber comprising a core and a cladding and having good heat resistance and flexibility.

BACKGROUND OF THE INVENTION

Conventional optical fibers are made from glass materials and widely used as optical signal-transmitting mediums for instrumentation between instruments or in an instrument, for transmission of data, for medical use, for decoration, for transmission of image, etc. However, they are poor in flexibility when their diameters are not small enough. Further, they are relatively fragile and are apt to be broken by impact. Furthermore, they are heavy, because their specific gravity is comparatively large. In addition, the optical fibers themselves as well as their connectors are expensive. Due to these drawbacks, attempt has been made to replace glass materials with plastic materials. The advantages with plastic materials are numerous. For instance, the resulting optical fibers are light, tough and flexible so that their diameters and numerical apertures can be made large. Further, for instance, their handling is easy and can be readily connected to light emitting and/or accepting elements.

In general, a plastic optical fiber comprises a core made of a plastic material having a larger refractive index and a good optical transmission and a cladding made of a plastic material having a smaller refractive index and a high transparency. In this structure, light is transmitted by reflection at the interface between the core and the cladding. A larger difference in refractive index between the plastic materials of the core and of the cladding provides the optical fiber with better optical transmission.

As the plastic material having good optical transmission, amorphous plastics are preferred, examples of which are polymethyl methacrylate, polystyrene, etc. (cf. Japanese Patent Publication No. 8978/1968).

In the production of the plastic optical fiber, while it is essential to make the refractive index difference between the core and the cladding as large as possible, it is also important to take account of adhesivity on the interface between the core and the cladding, influence of foreign materials on the polymer or physical, mechanical and/or chemical properties of the polymer from which the optical fiber is formed.

From this point of view, the optical fiber comprising the combination of polymethyl methacrylate and polystyrene or a certain kind of fluorine-containing polymethacrylate disclosed in Japanese Patent Publication No. 8978/1968 is noteworthy. However, the optical fiber comprising polystyrene has some drawbacks such that light transmitted through it has an inclination to be yellow, that the optical transmission efficiency is reduced particularly in a short wavelength range, and that the optical fiber tends to be deteriorated by light so that the flexibility of the optical fiber, which is inherently less flexible, is further decreased. In addition, the adhesivity between the core and the cladding is not good. Fluorine-containing polymethacrylate resins disclosed in the above Publication have poorer heat resistance than the core material, so that attenuation of light transmission increases and reliability as the light transmitting medium decreases as the temperature is raised. A raw material for the production of fluorine-containing methacrylate requires high technique in its production and purification and is expensive.

To overcome these drawbacks, it is proposed to use, as a cladding of the optical fiber, fluororubber (e.g. Viton (trade mark) LM, a copolymer comprising 60% by mole of vinylidene fluoride and 40% by mole of hexafluoropropene) (cf. Japanese Patent Publication No.8978/1968) or a copolymer comprising vinylidene fluoride and tetrafluoroethylene in a certain specific ratio (cf. Japanese Patent Publication No. 32660/1978 and Japanese Patent Kokai Publication (unexamined) No. 80758/1979). The former fluororubber comprising vinylidene fluoride and hexafluoropropene is tacky, but poor in adhesivity with methacrylic resin of the core. It is easily thermally decomposed so that it is difficult to melt mold such fluororubber. Further, it does not afford sufficient reflectance at the interface between the core and the cladding. Thus, it is not practically attractive. When the optical fiber is produced from a fluororubber having a high molecular weight by a complex melt spinning method, the fluororubber thermally shrinks and the cladding has surface waviness, which significantly deteriorates the optical transmission performance of the optical fiber.

Although the copolymer comprising vinylidene fluoride and tetrafluoroethylene has a low refractive index and good mechanical strength such as good flexing resistance and abrasion resistance. Since it is crystalline, its crystallinity is increased by heat treatment to decrease its transparency and thus optical transmission performance. Further, the adhesivity at the interface between the core and the cladding is deteriorated and reflection loss is increased. The optical transmission performance of this optical fiber may be improved, for example, by quenching it when producing it by the complex melt spinning method. However, the copolymer is further crystallized in a temperature range from 60° to 80° C. which the optical fiber encounters in use. This results in deterioration of the optical transmission performance. In addition, since thermal stability of vinylidene fluoride is insufficient, the optical fiber comprising the core made of the copolymer containing 60 to 80% by mole of vinylidene fluoride should be produced by the complex melt spinning method in a narrow processing temperature range, which is commercially disadvantageous.

SUMMARY OF THE INVENTION

One object of the invention is to provide an optical fiber comprising a core and a cladding and having good heat resistance, processability and flexibility.

Another object of the invention is to provide an optical fiber excellent in adhesivity between the core and the cladding and transparency.

Accordingly, the present invention provides an optical fiber comprising a core and a cladding, wherein the core is made of a polymer comprising units of methyl methacrylate, and the cladding is made of a copolymer comprising units of vinylidene fluoride and 0.5 to 10% by mole of units of hexafluoropropene.

DETAILED DESCRIPTION OF INVENTION

The copolymer comprising units of methyl methacrylate which is used for the core is preferably selected from the group consisting of a homopolymer of methyl methacrylate and a copolymer comprising at least 60% by mole of units of methyl methacrylate and units of at least one comonomer selected from the group consisting of ethyl methacrylate, propyl methacrylate, butyl methacrylate, isobutyl methacrylate, cyclohexyl methacrylate and methacrylic ester the ester moiety of which has an alicyclic hydrocarbon group having more than 8 carbon atoms. Among them, the methacrylic ester, the ester moiety of which has the alicyclic hydrocarbon group having more than 8 carbon atoms is preferred. Copolymers comprising at least 70% by mole of units of methyl methacrylate are preferred as the core material since they are highly pure and transparent and easily available.

The methacrylic ester the ester moiety of which has the alicyclic hydrocarbon group having more than 8 carbon atoms may be prepared by esterifying methacrylic acid or its chloride with a monohydric alcohol of the formula: ROH wherein R is the above defined alicyclic hydrocarbon group. Specific examples of the monohydric alicyclic alcohol are 1-adamantanol, 2-adamantanol, 3-methyl-1-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, octahydro-4,7-methanoinden-5-ol, octahydro-4,7-methanoinden-1-ylmethanol, p-menthanol-8, p-menthanol-2, 3-hydroxy-2,6,6-trimethylbicyclo[3.1.1]heptane, 3,7,7-trimethyl-4-hydroxybicyclo[4.1.0]heptane, borneol, 2-methylcamphanol, fenchyl alcohol, l-menthol, 2,2,5-trimethylcyclohexanol, etc. The corresponding methacrylic esters of these monohydric alcohols are favorably usable.

Among the alicyclic hydrocarbon group, those having 10 to 18 carbon atoms are favorable for improvement of the heat resistance.

When the methacrylic ester has an aromatic hydrocarbon group in place of the alicyclic hydrocarbon group in the ester moiety, the resulting core greatly increases attenuation of light transmission, thus restricting the application of the optical fiber.

Since the polymer comprising the units of the methacrylate ester has a high refractive index, it is particularly useful as a core material of the optical fiber. Particularly favorable are 1-adamantyl methacrylate, 2-adamantyl methacrylate, 3,5-dimethyl-1-adamantyl methacrylate, bornyl methacrylate, p-menthan methacrylate, 2-methylcamphan methacrylate, fenchyl methacrylate, l-menthyl methacrylate, 2,2,5-trimethylcyclohexy methacrylate, etc.

The polymer comprising the units of the methacrylate esters may further comprise up to 10% of alkyl acrylate, the alkyl moiety of which has preferably 1 to 6 carbon atoms. These alkyl acrylates may be copolymerized with methyl methacrylate and the methacrylic ester. Preferred examples of the alkyl acrylate are methyl, ethyl, n-propyl, cyclohexyl and 2-ethylhexyl acrylate.

The cladding, which is the other essential component of the optical fiber, is made of a copolymer comprising vinylidene fluoride and 0.5 to 10% by mole, preferably 1 to 9% by mole of hexafluoropropene and having a number average molecular weight of about 10,000 to 500,000, preferably 10,000 to 300,000. Preferably, the copolymer has a refractive index of 1.35 to 1.42, particularly 1.40 to 1.42. When the content of hexafluoropropene is less than 0.5% by mole, the optical transmittance is worsened and when it is more than 10% by mole, extrudability of the copolymer during complex melt spinning and adhesivity of the copolymer with the core are deteriorated and the optical transmittance is worsened.

The copolymer used as the cladding material according to the invention may further comprise other comonomer. Specific examples of such comonomer are tetrafluoroethylene, trifluoroethylene, trifluorochloroethylene, trifluoropropene, pentafluoropropene, perfluoro(alkyl vinyl ether) (e.g. perfluoro(methyl vinyl ether), perfluoro(propyl vinyl ether), etc.), hexafluoroisobutylene, etc.

The copolymer used as the cladding material preferably comprises at least 60% by mole, more preferably at least 70% by mole, most preferably at least 85% by mole of vinylidene fluoride.

The polymer to be used as the core material may be prepared by a per se conventional polymerization procedure such as suspension polymerization and bulk polymerization. In these preparation, a great care should be taken to prevent the contamination of any foreign material into the produced polymer. For instance, the suspension polymerization usually requires the use of a large amount of water so that any foreign material contained therein tend to be included in the produced polymer. Any foreign material may also contaminate the produced polymer during the operation of dehydration therefrom. Because of this reason, it is preferred to produce the core material by the continuous bulk polymerization at an elevated temperature and the subsequent continuous elimination of volatile materials containing unreacted monomers from the polymerization product, and then to carry out the manufacture of the optical fiber successively. Alternatively, the optical fiber is preferably produced by bulk polymerizing the core material and co-extruding the core material and the cladding material to form an optical fiber comprising the core and the cladding.

The polymerization of the core material may be initiated by the use of a radical initiator, examples of which are azo compounds (e.g. 2,2'-azobis(isobutyronitrile), 1,1'-azobis(cyclohexanecarbonitrile), 2,2'-azobis(2,4-dimethylvaleronitrile), azobisisobutanol diacetate, azo-t-butane), organic peroxides (e.g. di-t-butyl peroxide, dicumyl peroxide, methyl ethyl ketone peroxide, di-t-butyl perphthalate, di-t-butyl peracetate, di-t-amyl peroxide), etc. The amount of the initiator is preferably from 0.001 to 1% by mole of the monomer to be polymerized.

In order to control the molecular weight of the polymer, a chain transfer agent may be added to the polymerization system. Specific examples of the chain transfer agent are t-butylmercaptan, n-butylmercaptan, n-octylmercaptan, n-dodecylmercaptan, etc. The amount of the chain transfer agent is usually not more than 1 mol % of the monomer.

The copolymer to be used as the cladding material may be prepared by any conventional polymerization procedure such as bulk polymerization, suspension polymerization, solution polymerization and emulsion polymerization. Among them, the suspension, solution and emulsion polymerization procedures are commercially preferred. The solution and bulk polymerization may be initiated by the use of a polymerization initiator such as azo compounds (e.g. azobisisobutyronitrile, azobisisovaleronitrile, etc.), organic peroxides (e.g. di-t-butyl peroxide, di-t-butyl peroxyisobutylate, diisopropyl peroxydicarbonate, etc.), and fluorine-containing compounds (e.g. [Cl(CF$_2$CFCl)$_2$CF$_2$COO]$_2$, [H(CF$_2$CF$_2$)$_m$COO]$_2$, etc.). The emulsion polymerization may be initiated by the used of a polymerization initiator such as persulfate (e.g. ammonium persulfate, potassium persulfate, etc.), and water-soluble organic peroxides (e.g. disuccinic acid peroxide, t-butyl hydroperoxide, etc.). Preferably, polymerization pressure is from 0 to 100 kg/cm$^2$G, and polymerization temperature is from 0° to 130° C.

In the preparation of the cladding material, such great care as taken in the preparation of the core material is not needed since the presence of the contamination in the cladding does not affect the light transmission so greatly as in case of the core. Usually, the monomer of the cladding material is filtrated before polymerization.

The weight ratio of the core material and the cladding material is from about 70:30 to 98:2, preferably from about 80:20 to 95:5. The optical fiber of the invention usually has a diameter of from about 0.15 mm to 1.5 mm, preferably from about 0.20 to 1.0 mm.

The optical fiber of the invention comprises the core of the specific polymer and the cladding of the specific fluorine-containing copolymer so that it is used in a wider temperature range than the conventional plastic optical fiber and has excellent heat resistance and flexibility. Since the optical fiber is stable even at a high temperature over 110° C., it can be applied to automobiles, vessels, aircrafts, robots, etc. Further, it will have wide application in communication in premises or buildings.

Practical and presently preferred embodiments of the present invention are shown in the following Examples wherein parts and % are by weight unless otherwise indicated.

In these examples, the attenuation of light transmission was measured as follows:

As the illuminant, a halogen-tungsten lamp was employed. Using a diffraction grating spectrophotometer, the intensities of the outputs from the optical fiber to be tested and from the standard optical fiber at a wavelength of 650 nm were read off by means of silicone photodiode. The attenuation of light transmission ($\alpha$) was calculated according to the following equation:

$$\alpha(dB/Km) = \frac{10}{L} \log\left(\frac{I}{I_o}\right)$$

wherein L is the length of the optical fiber (Km), $I_o$ is the intensity of light at the entrance and I is the intensity of light at the exit.

The heat resistance of the optical fiber was evaluated by heating the optical fiber at a predetermined temperature for a predetermined period of time and comparing the optical transmission loss before and after heating.

The flexibility of the optical fiber was evaluated by winding the optical fiber around a rod and determining the minimum radius (r) of the rod at which the optical fiber was broken.

REFERENCE EXAMPLE

In a 3 liter stainless steel autoclave equipped with a magnetic stirrer, deoxidized water (1 liter) and methylcellulose (50 cp, 0.3 g) were charged and oxygen in the autoclave was replaced with nitrogen. Then, 1,1,2-trichloro-1,2,2-trifluoroethane (hereinafter referred to as "Flon-113") (300 ml) was charged under reduced pressure. Thereafter, the autoclave was pressurized at 40° C. by injecting a gaseous monomeric mixture of vinylidene fluoride and hexafluoropropene in a molar ratio of 87:13 to 10 kg/cm$^2$G and the mixture was stirred at 40° C.

A solution of diisopropyl peroxydicarbonate (4 g) in Flon-113 (10 ml) was charged in an initiator-charging container having a volume of about 125 ml and cooled with dry ice and air in the container was replaced with nitrogen. Then, the solution was pressurized by nitrogen gas and injected in the autoclave to initiate polymerization.

In a 20 liter stainless steel autoclave for charging a monomeric mixture, vinylidene fluoride and hexafluoropropene in a molar ratio of 93:7 were contained. The monomer-charging autoclave was connected with the polymerization autoclave. When the pressure in the autoclave dropped by 1 kg/cm$^2$G, the monomeric mixture was injected to keep the polymerization pressure in a range of from 9 to 10 kg/cm$^2$G.

After carrying out the polymerization for 4 hours and 50 minutes in this manner, the unreacted monomers were removed and the polymerization product was recovered and dried to obtain the copolymer (200.3 g).

According to the analysis of the produced copolymer by $^{19}$F-NMR, the molar ratio of vinylidene fluoride and hexafluoropropene was found to be 91.6:8.4. Flow rate measured by a Koka-type flow tester having a nozzle of 1 $\phi \times$ 1 liter (manufactured by Shimadzu) with the 7 kg load at 230° C. was $1.82 \times 10^{-2}$ ml/sec.

EXAMPLE 1

To a mixture of bornyl methacrylate (30 parts) which had been purified by distillation under reduced pressure, methyl methacrylate (69 parts) and methyl acrylate (1 part), n-dodecylmercaptan (0.025 part) and 2,2'-azobis(2,4-dimethyl valeronitrile) (0.10 part) were added in the absence of oxygen. The obtained monomeric mixture was charged in a reactor kept at 150° C. and prepolymerized with a residence time of 8 hours. Then, the prepolymer was charged in a screw conveyor kept at 220° C. with a residence time of 2 hours to complete the polymerization to obtain a core material. Intrinsic viscosity [$\eta$] (25° C., chloroform), 0.90. Refractive index, 1.49.

The thus obtained core material was supplied in an extruder with a two-stage vent heated at 255° C. and extruded from a central part of a two-color extrusion nozzle to form a core strand, while the copolymer of vinylidene fluoride and hexafluoropropene prepared in Reference Example was melt coated as the cladding around the core strand to form an optical fiber. A weight ratio of the core material and the cladding material was 90:10.

The attenuation of light transmission at a wavelength of 650 nm as measured at 25° C. and 70° C. was 200 dB/Km and 200 dB/Km, respectively.

After heating at 110° C. for 72 hours, the attenuation of light transmission was 210 dB/Km. This shows that the optical fiber of the invention has good heat resistance.

The flexibility of the optical fiber was r=2.5 mm.

EXAMPLES 2 to 8

In the same manner as in Example 1 but using core and cladding materials shown in Table 1 in which MMA, VdF and HFP stand for methyl methacrylate, vinylidene fluoride and hexafluoropropene, optical fibers of from 0.85 to 0.75 mm in diameter were prepared. Their attenuation of light transmission before and after heating and flexibility are shown in Table 1.

TABLE 1

| Example No. | Polymer for core Monomers (%) | [η] (25° C., CHCl₃) | Refractive index | Polymeric material for cladding Monomers (mole %) VdF:HFP | Refractive index (20° C.) | Attenuation of light transmission (dB/Km) Room Temp. | After heating (°C. × Hr) | Flexibility (mm) |
|---|---|---|---|---|---|---|---|---|
| 2 | Fenchyl methacrylate/MMA/Methyl acrylate (15:83:2) | 0.96 | 1.49 | 93.5:6.5 | 1.41 | 260 | 260 (120° C. × 6 hrs.) | 15 |
| 3 | Adamantyl methacrylate/MMA/Butyl acrylate (5:93:2) | 0.70 | 1.50 | 93.5:6.5 | 1.41 | 350 | 360 (110° C. × 3 hrs.) | 5 |
| 4 | 1-Menthyl methacrylate/MMA/Methyl acrylate (40:58:2) | 0.60 | 1.49 | 93.5:6.5 | 1.41 | 200 | 220 (90° C. × 2 hrs.) | 10 |
| 5 | 1-Menthyl methacrylate/MMA/Ethyl acrylate (25:73:2) | 0.65 | 1.50 | 93.5:6.5 | 1.41 | 400 | 400 (100° C. × 24 hrs.) | 15 |
| 6 | Adamantyl methacrylate/MMA/Methyl acrylate (5:93:2) | 0.90 | 1.50 | 93.5:6.5 | 1.41 | 250 | 250 (110° C. × 24 hrs.) | 10 |
| 7 | Bornyl methacrylate/MMA/Methyl acrylate (25:70:5) | 0.70 | 1.49 | 93.5:6.5 | 1.41 | 180 | 180 (120° C. × 240 hrs.) | 5 |
| 8 | MMA/Methyl acrylate (25:70:5) | 0.70 | 1.49 | (Note *1) | 1.41 | 180 | 250 (100° C. × 24 hrs.) | 5 |

(Note *1) VdF:HFP:Hexafluoroisobutylene = 91.5:7.0:1.5

EXAMPLE 9 to 13 AND COMPARATIVE EXAMPLE 1 and 2

In the same manner as in Reference Example but varying the molar ratio of vinylidene fluoride and hexafluoropropene as shown in Table 2, cladding materials were prepared.

Then, in the same manner as in Example 1 but using, as a core material, a copolymer of methyl methacrylate and methyl acrylate (Molar ratio, 97:3. Melt index, 6) and, as a cladding material, one of the above fluorine-containing copolymer and extruding the core material at 220° C., an optical fiber of 1 mm in diameter was formed.

Transmittance of white light emitted by a tungsten lamp through the 50 cm long optical fiber was measured. The results are shown in Table 2.

For comparison, optical fibers were produced in a conventional manner and their transmittance of white light was measured. The results are also shown in Table 2.

TABLE 2

| | Polymer for cladding VdF:HFP (by mole) | Extrudability | Transmittance (%) |
|---|---|---|---|
| Example 9 | 99:1 | Good | 61 |
| Example 10 | 97:3 | Good | 75 |
| Example 11 | 95:5 | Good | 80 |
| Example 12 | 93:7 | Good | 80 |
| Example 13 | 91:9 | Good | 81 |
| Comparative Example 1 | 100:0 | Good | 30 |
| Comparative Example 2 | 80:20 | (Note *1) | Not measured |

(Note *1) Any optical fiber could not be formed due to poor extrudability.

What is claimed is:

1. An optical fiber comprising a core and cladding, wherein the core is made of a copolymer comprising at least 60% by mole of units of methyl methacrylate and units of a methacrylic ester the ester moiety of which has an alicyclic hydrocarbon group having more than 8 carbon atoms, and the cladding is made of a copolymer consisting essentially of units of vinylidene fluoride and 0.5 to 7% by mole of units of hexafluoropropene.

2. An optical fiber according to claim 1, wherein the methacrylic ester is one the ester moiety of which has an alicyclic hydrocarbon group having 10 to 18 carbon atoms.

3. An optical fiber according to claim 1, wherein the methacrylic ester is one selected from the group consisting of 1-adamantyl methacrylate, 2-adamantyl methacrylate, 3,5-dimethyl-1-adamantyl methacrylate, bornyl methacrylate, p-menthan methacrylate, 2-methylcamphan methacrylate, fenchyl methacrylate, l-menthyl methacrylate and 2,2,5-trimethylcyclohexy methacrylate.

4. An optical fiber according to claim 1, wherein the cladding is made of a copolymer consisting essentially of vinylidene fluoride and 1 to 7% by mole hexafluoropropene.

5. An optical fiber according to claim 1, wherein the copolymer consisting essentially of vinylidene fluoride and hexafluoropropene has a number average molecular weight of about 10,000 to 500,000.

6. An optical fiber according to claim 1, wherein the copolymer consisting essentially of vinylidene fluoride and hexafluoropropene has a refractive index of 1.35 to 1.42.

7. An optical fiber of claim 1, wherein the copolymer of the core comprises at least 70% by mole of units of methyl methacrylate.

8. An optical fiber of claim 1, wherein the copolymer of the core further comprises up to 10% of alkyl acrylate.

9. An optical fiber of claim 1, wherein the weight ratio of the core to the cladding is from about 70:30 to 98:2.

10. An optical fiber of claim 9, which has a diameter of from about 0.15 mm to 1.5 mm.

11. An optical fiber of claim 1, wherein the weight ratio of the core to the cladding is from about 80:20 to 95:5.

12. An optical fiber of claim 11, which has a diameter of from about 0.20 mm to 1.0 mm.

* * * * *